Patented Feb. 3, 1942

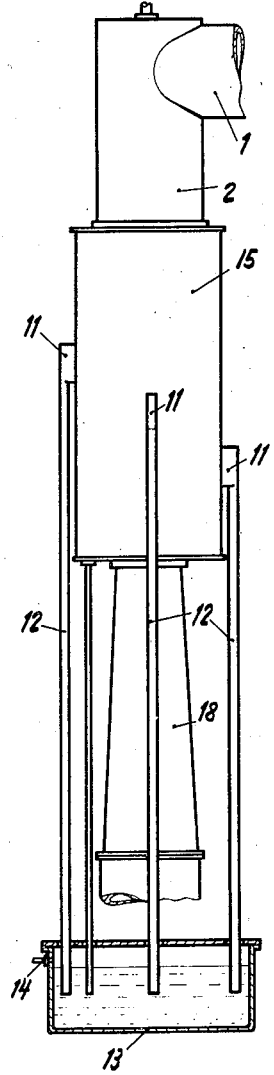
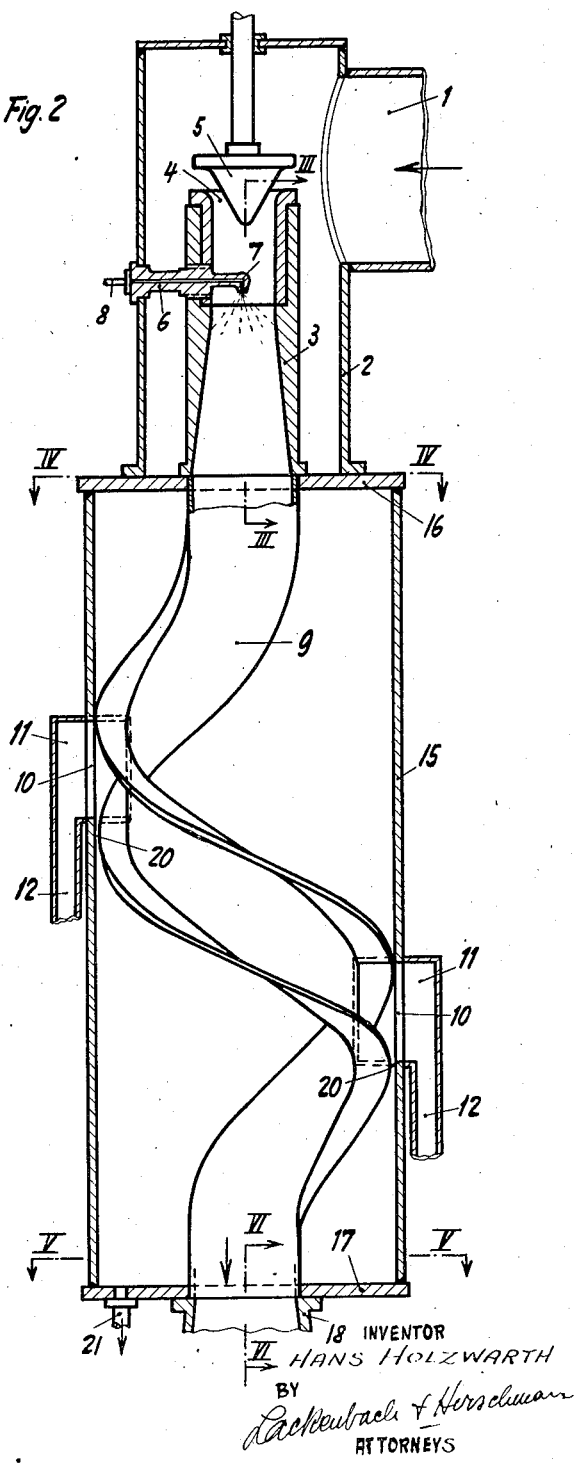

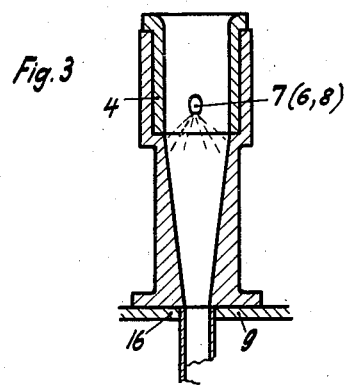
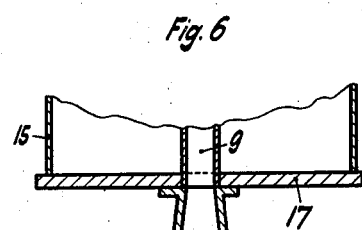
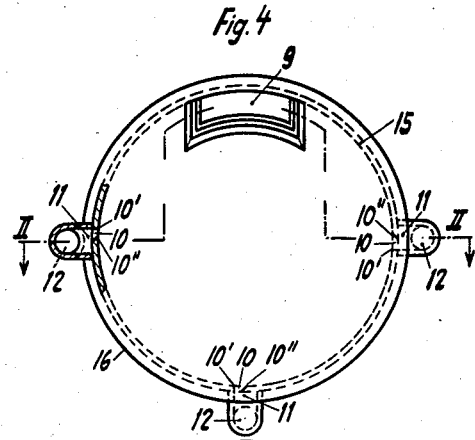
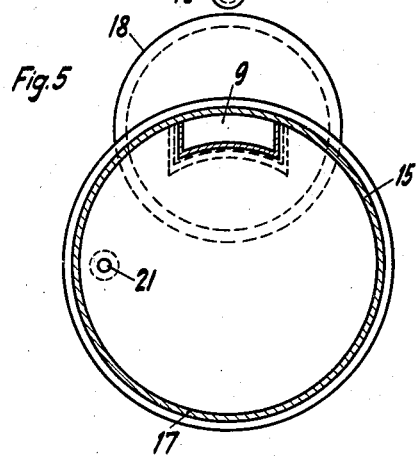
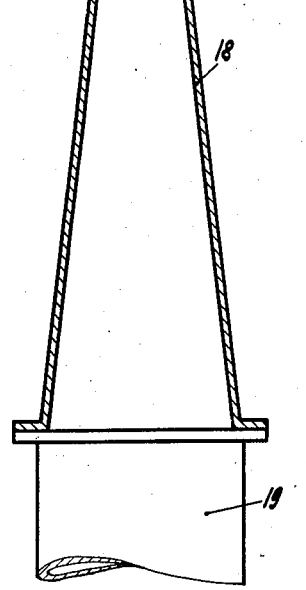

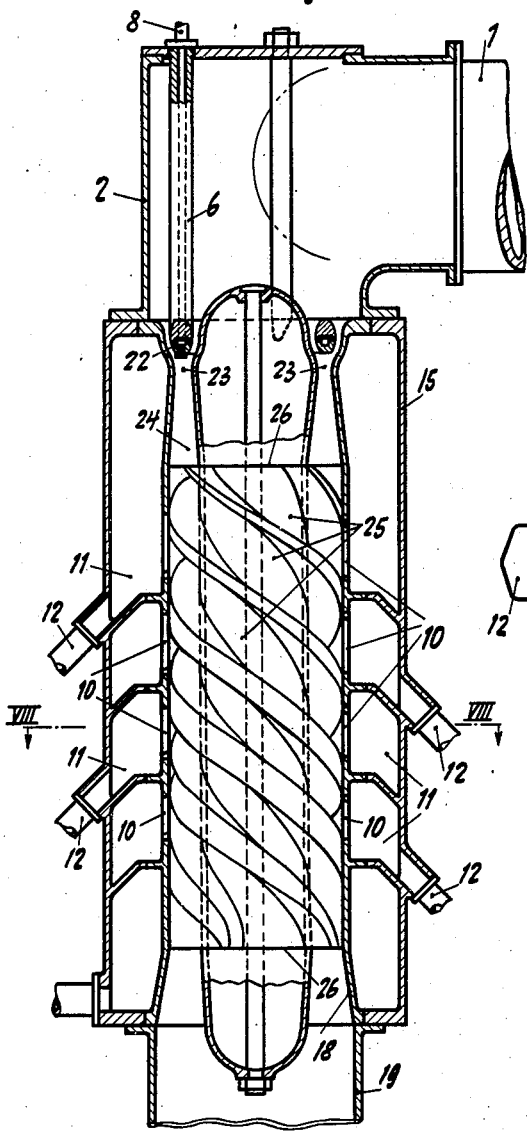
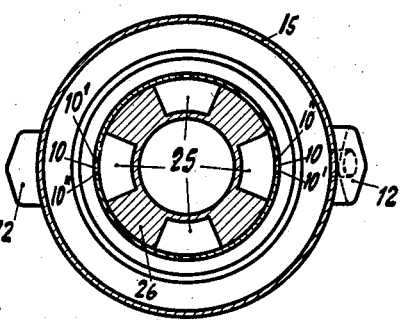

2,271,642

UNITED STATES PATENT OFFICE 2,271,642

METHOD AND APPARATUS FOR PURIFYING GASES

Hans Holzwarth, Dusseldorf, Germany, assignor to Holzwarth Gas Turbine Co., San Francisco, Calif., a corporation of Delaware Application December 24, 1937, Serial No. 181,562
In Germany December 28, 1936

22 Claims. (Cl. 62—122)

The present invention relates to the purification of gases, and more particularly to an improved method for removing suspended particles from gases, and to an apparatus for carrying out such process. More specifically, the invention relates to an improved method and apparatus for the separation of dust particles from blast furnace and other fuel gases for use in combustion engines, such as the explosion chambers of explosion turbines.

Of all of the known methods of gas purification, the electrostatic method leads to the most complete purification, but requires an extremely high investment cost. The dry-filter process has the disadvantage that the gases must be very dry in order to avoid clogging of the filters, it being necessary to heat up the gases prior to the filtering and then to cool them after they have been purified. The filters themselves must be continually changed and cleaned; they are, moreover, very bulky. Among the various known methods of gas purification, therefore, the scrubbing process, in spite of its incompleteness, has enjoyed the widest use because it is simple, economical and reliable in operation and requires only a comparatively small plant which can be confined within a small space.

The present invention relates to the last-named general method of gas purification by the loading or weighting of the foreign particles with a liquid, and is based upon the discovery that by the control of the flow and desirably also of the heat condition of the gas to be purified, combined with the conversion of the separating liquid into a state of extremely fine division, a highly efficient and economical separation of the dust, oil, and other foreign particles can be attained.

One of the features of the present invention in its preferred mode of execution is the fact that the atomization of the scrubbing liquid is effected not merely by injection at high pressure, but by introduction into a still more rapidly moving stream of the gas to be purified. According to the invention, therefore, there is imparted to the gas to be purified, in the vicinity of the introduction of the washing liquid, a velocity at which the relative velocity between the liquid and the gas during the pressure injection of the liquid is very great, the subdivision of the liquid being improved in correspondence with this excess of gas velocity over the liquid velocity.

The heat condition of the gases is moreover, modified in the course of my process and such change may be utilized to contribute to the thoroughness of the washing operation. Generally, the gas to be purified contains liquids in the form of vapor. While this is always the case with industrial gases, such as illuminating, ordinary furnace, blast furnace, coke oven, generator and other gases, in the few exceptional cases in which vaporous components are absent in the gas to be purified, a prior introduction of such vapors into the gas causes no difficulties of any kind. If now, the heat condition of the gas to be purified is suddenly changed by cooling, then the vapors in the gas will at least partially condense. It is a known physical phenomenon that the condensation always proceeds from so-called condensation cores or nuclei; in the present case, the impurities in the gases, that is, the dust, oil or other particles, act as such cores. By causing the gas to be purified to become cooled below the dew point of the vapor components contained therein, there is attained a sure meeting of the suspended particles and condensing liquid, so that separation of the liquid agglomerates about the individual particles effects at the same time a separation of such particles. The loading of the foreign particles in this way has the special advantage that the condensate formation is distributed uniformly and in fine subdivision throughout the whole body of gas to be purified to a degree not easily attainable by other measures and to an extent corresponding to the quantity of dust and other particles contained in the gas.

It is accordingly the general object of the invention to provide an improved method and apparatus for the purification of gases by loading or weighting the particles suspended therein with a liquid, as by the aid of cooling of the gases in a manner to be described hereinbelow, or by the aid of a liquid introduced into the gas stream in a highly atomized condition, and preferably by both measures, followed by deflection of their path to cause separation of the liquid agglomerates having the foreign particles entrained therein.

The invention will be described in greater detail by reference to the accompanying drawings illustrating, by way of example, two satisfactory embodiments of the invention. In said drawings, Fig. 1 is a side view of a purifying apparatus constructed in accordance with the invention;

Fig. 2 represents a longitudinal vertical section on an enlarged scale through the dust-depositing section of the apparatus and is taken along the lines II—II of Fig. 4;

Fig. 3 is a vertical section through the expansion nozzle along the lines III—III of Fig. 2;

Fig. 4 shows a plan view of the dust-separating section of the apparatus along the line IV—IV of Fig. 2, the expansion nozzle and the casing surrounding the same being removed;

Fig. 5 illustrates a horizontal section through the dust-separating apparatus along the line V—V of Fig. 2;

Fig. 6 is a vertical longitudinal section through the compression nozzle and is taken along the line VI—VI of Fig. 2;

Fig. 7 shows a modification, the view being in section through the dust-separating mechanism; and Fig. 8 represents a horizontal section taken along the line VIII—VIII of Fig. 7.

Referring to Figs. 1-6, the numeral 1 indicates the feed conduit for the gas to be purified. In the casing 2 is arranged the expansion nozzle 3, whose inlet cross-section 4 can be varied by means of the adjustable throttling member or valve 5. A nozzle is shown at 6, having a nozzle head 7, to which water under pressure is conducted by way of conduit 8. To the enlarged discharge cross-section of the nozzle 3, which may be rectangular in cross-section, is attached a rectangular channel 9 which is of substantially uniform cross-section and is winding or helical in shape. At spaced points on the outer periphery of the curvilinear or helical channel 9, whose outer wall may be formed by the drum or casing 15, are provided slits 10 extending practically over the whole vertical height of the flat or straight outer surface of the channel at such points, the same being transverse to the direction of flow of the gases. The edge 10' of these slits, which is first struck in the direction of flow of the gases, is well-rounded, while the second edge 10'' is sharp and undercut. Conduits 12 are connected to the slits 10 by way of suitable connections 11, the conduits being in communication with a storage tank 13 for the separated fluid. By arranging a lead-off tube 14 above the outlets of the tubes 12, provision is made that the openings of the tubes lie below the level of the separated liquid, so that the escape of gas through said tubes is prevented.

The channel 9 is suitably arranged inside of the drum 15 which carries the end cover plates 16 and 17, and by way of such plates, supports the casing 2 and is secured to the expansion nozzle 18, which communicates with the lower end of the channel 9 and passes into the conduit 19, which carries off the purified gases, as will be explained hereinbelow. In addition to the slits 10, openings 20 may be provided within the drum 15 for carrying off the condensed water. The condensed water collecting in the drum is in this case drawn off by a pipe 21. Researches have, however, shown that an efficient separation of the water is possible only at the outer circumference of the channel 9, so that the slits 10 must in every case be provided, while the openings 20 serve merely as auxiliary elements.

The method of separation in the apparatus thus far described, is as follows:

The gas to be purified passes through the pipe 1 into the housing 2 and is increased in speed by the fall of pressure in the expansion nozzle 3. The narrowest cross-section 4 of the nozzle 3 can, as indicated above, be regulated by adjustment of the throttling member 5, the volume of gas flowing through being thus correspondingly varied. A large increase in the velocity of the gas to be purified occurs in the nozzle 3 with simultaneous cooling. As the gas, in consequence of the usual pre-treatment in scrubbers, is thoroughly saturated with moisture, there form, as a result of the temperature drop in the nozzle 3, a very large number of condensed water droplets, distributed uniformly over the whole gas mass. As is known, these water droplets attach themselves to dust particles which act as cores or nuclei for the condensed water particles. The complete development of the condensation is supported by the simultaneous introduction of water under pressure with the aid of the nozzle 6, 7, the additionally introduced water, aided by the high gas velocity at the point of introduction of the water, being finely atomized and brought into the condition of a cloud. In this way, it is possible to bind by far the greater number of dust particles to such water particles. In the channel 9, the water droplets formed by the condensation and atomization are directed out of the straight path of flow, and under the action of inertia and centrifugal force, these water droplets are directed toward the outer walls of the channel 9. There, because of the friction against the walls of the channel, their velocity is reduced but under the action of gravity and particularly of the rapidly moving current of gases, they are moved further until they reach one of the slits 10. The edge 10' of the slit 10, which is first engaged by the so-formed film of water, facilitates the entry of the water into the parts 11 and 12, while the edge 10'' directs those water droplets which, in consequence of their inertia, have bridged the distance between the edges of the slits 10, for the most part into the parts 11 and 12; the remainer is caught at the next device 10, 11, 12.

By reason of the fact that the tubes 12 open beneath the level of the separated liquid in the collecting tank 13, passage of gas into the tubes 12 is prevented effectively, as already mentioned, for the supply tank 13 is arranged so low that the water cannot be sucked up to the slits 10 by the reduced pressure in the channel 9. As the water drops surround the dust and other particles contained in the gas, they carry off through the tubes 12, and into the container 13, practically all of the impurities contained in the gases in an extremely efficient manner.

In the form of the invention illustrated in Figs. 1-6, three slits 10 are shown with their associated lead-off pipes 12 (see Fig. 4). It is important that the flow velocity of the gases be not reduced considerably before the completion of the water separation, since such a reduction in velocity would result in a partial re-warming of the gases and thus in a partial re-evaporation of the separated water. The high flow velocity of the gases is reduced in the compression nozzle 18, connected to the channel 9, to the usual supply velocity of the gases, whereby the work of the gases expended in the expansion is recovered to a very great extent by pressure increase of the gases. The purified gases pass under this pressure into the conduit 19.

In the modified construction shown in Figs. 7 and 8, the parts corresponding structurally or functionally to parts shown in Figs. 1-6 are similarly designated. The quantity of gas flowing into the apparatus, in the construction according to Figs. 7 and 8, is adjusted by a regulating valve (not shown) arranged in the supply pipe 1. By this measure the result is obtained that the flow velocities in the dust separator are practically equal over the whole range of regulation under the assumption that a gas utilizing apparatus, for example a centrifugal compressor, is connected to the conduit 19, which gas utilizer sucks in a practically constant quantity of gas per unit of time independently of the pressure. The sucked-in gases are strongly accelerated in the annular nozzle 23. At the same point there is arranged an annular injection nozzle 22 for water under pressure, the water passing into the nozzle head through a pipe 6 which is connected with a supply line 8. As the gases flow past the nozzle 22 at a far higher velocity than can be imparted to the water merely by increase of pressure, the flow differential between the water and gas is extremely high and the atomization is correspondingly fine. The velocity of the gases is somewhat reduced in the widening portion 24 which is connected to the reduced section 23. Simultaneously, the opportunity is afforded to the atomized water, which is in the form of a cloud, to distribute itself uniformly throughout the whole body of gas without coming into contact with the walls. The actual pressure drop and water separation in the sense of the present invention take place only in the helically-shaped channels 25 of the cylindrical body 26. The channels 25 become narrower, at first slowly and then more rapidly, up to a narrowest cross-section which is in the vicinity of the discharge ends of the channels, after which they again enlarge in the manner of a Venturi nozzle. The gas is thus expanded in the helical channels, accelerated and cooled, aided by the water droplets which are distributed extremely finely and uniformly throughout the whole body of gas.

The channels 25 may be produced by cutting the surface of the cylindrical body 26 in the manner of a multiple thread, except that the width of the cut, measured axially, is gradually reduced until the selected region of minimum cross-section is reached, whereupon the cut is made to increase in width. The walls of the channels will accordingly be thickest where the channels are narrowest, and vice versa.

With the coaction of the water injection, additional water droplets are formed upon the comparatively long path inside of the helical channels 25 through condensation, and deposit themselves about dust cores insofar as the latter have not already been engaged by the innumerable water droplets formed by the atomizing of the injected water. During the flow through the channels 25, the so-formed water droplets, as a result of the action of centrifugal and inertial forces, are thrown toward the outermost peripheries of the channels and pass through the slits 10 distributed along the length of the channels in the same way as the atomized wash water, as has been described hereinabove in connection with Figs. 1-6. The dust-laden water is collected at 11 and is drawn off by the conduits 12. In the last, widened portion of the helical channels 25, the cleaned gas, which has become dry by the separation of the water, is again slowly compressed. This compression takes place in the part 18 which acts as a velocity reducing nozzle.

As a result of the high velocity initially imparted to the gases, not only is the water atomization an incomparably finer one than is the case with purely mechanically acting atomizing devices, but the centrifugal force which throws the water droplets outwardly assumes a value corresponding to the high flow velocity of the same and the strong deflection or rather small radii of the paths of flow, such force being many times the centrifugal force attainable with known gas scrubbers. For example, the gas in the cross-section 23 of the apparatus shown in Fig. 7 is accelerated to about 70 m./sec. In the part of the gas path acting as a diffuser, this velocity is reduced to about 35-40 m./sec. with conversion of a part of the flow energy into pressure, and is again increased to about 70 m./sec. at the inlets of the helical channels 25. Up to the narrowest cross-sections of the channels, which are located at approximately the level of the lowest slit 10, the velocity increases to about 120 m./sec. by further reduction in the cross-section of the channel. Under these conditions, the expression $v^2/r$ for the centrifugal force amounts to 28,400 at the inlet of the helical channel, the term $v$ being the forward flow velocity expressed in m./sec. and $r$ the radius of curvature in meters of the path in which the movement takes place. This value rises to 81,600 up to the narrowest cross-section of the channels 25. In contrast thereto, the corresponding value in the case of a well-known scrubber is only about 3,600. In this way, the centrifugal force which is available for effecting separation of the water droplets has been increased manyfold, so that it is not only possible to bind the dust practically completely to the water particles, but to separate out almost completely the water which has become contaminated by the dust.

The process and apparatus according to the invention are particularly suitable for those cases in which the gas to be purified must be compressed, as for example, in the operation of explosion turbine plants; for on the one hand compressors, and particularly centrifugal compressors, are very sensitive towards solid foreign matter; on the other hand, no additional compression apparatus is required to enable the especially advantageous expansion of the vaporous components in the gas below the dew point to be accomplished in accordance with the invention. The compressors can be quite correctly dimensioned from the start in correspondence with the process above described. The increased expenditure of compression work is maintained within moderate limits in view of the almost complete recovery of the working capacity of the gases consumed during the expansion. The required temperature reduction is particularly small when the gas is supplied saturated with moisture, for example by pre-treatment in scrubbers for precipitating of certain of the accompanying matter. At a supply temperature of the gases of the order of the usual outside temperature, there is required a temperature drop of the order of only about 10-15° C. when the gases are saturated with water vapor, in order to effect separation of about ½ of the moisture contained in the gases. The moisture content of the saturated gas, for example, between 10° and 30° C., amounts to 10 grams per cubic meter at 10°, 20 grams at 20°, and 30 grams at 30° C., so that on fall of the temperature from 30° to 10°, the water content falls from 30 to 10 grams per cubic meter, that is, to a third. The amounts of liquid dealt with are thus very considerable, but with the improved process described herein the separation is efficiently accomplished with a minimum expenditure of energy.

It will be understood that variations from the specific details of process and structure described above may be resorted to within the scope of the appended claims without departing from the spirit of the invention.

I claim:

1. Apparatus for the purification of gases by removal of suspended particles contained therein, comprising a conduit for the gas to be purified, an expansion nozzle in such conduit, a nozzle for introducing a precipitating fluid into the gas stream at a point at which the gas has been accelerated by means of the expansion nozzle above the admission velocity of the precipitating fluid into the gas stream, and a curvilinear channel connected to the expansion nozzle and having openings at the outer portion thereof toward which the fluid-loaded particles are thrown, for effecting discharge of the so separated fluid precipitates.

2. Apparatus according to claim 1, wherein the channel is helical in form and wherein the portion of the channel which is connected with the leading in portion for the separating fluid is built in the form of a Venturi nozzle, whereby the recovery of the work of the gases which had been converted into flow energy takes place partially in the diffusor of the Venturi nozzle.

3. Apparatus for the purification of gases by removal therefrom of suspended dust and other foreign matter with the aid of a precipitating liquid sprayed into the gases comprising, in combination, a gas feeding conduit, a gas nozzle having a reduced cross section relative to the gas feeding conduit to effect expansion and acceleration of the velocity of the gases, a spray nozzle for precipitating liquid discharging into the gas path in a region of increased gas velocity, to cause atomization of the liquid by the gas, and a curvilinear channel attached to the gas nozzle in the direction of flow of the gases and provided with openings at its periphery at which the projected precipitating liquid is separated together with the foreign bodies from the purified gas flowing past the openings.

4. Apparatus according to claim 3, wherein the gas expansion nozzle is constructed in the form of a Venturi nozzle.

5. Apparatus according to claim 3, wherein the channel is provided with a plurality of discharge openings for the liquid containing the separated foreign matter, said openings being arranged in series in the path of flow of the gases, and being so constructed and arranged that the precipitating liquid can flow off radially from the interior of the channel outwardly.

6. Apparatus according to claim 3, wherein the discharge openings for the precipitating liquid and foreign matter are arranged upon the outer periphery of the curvilinear channel and are constructed in the form of slits extending over the whole height of the channel, the outer wall of the channel being straight in a direction transverse to the direction of flow of the gases, and lead-off conduits connected with said slits.

7. Apparatus according to claim 3, wherein the edge of a discharge opening first contacted by the gases in the direction of flow of the latter is rounded off, while the associated following edge is sharp and is undercut in the direction from the interior outwardly.

8. Apparatus according to claim 3, including lead-off conduits for the precipitating liquid and precipitated foreign bodies, and a collecting tank therefor, said conduits debouching separately of each other into the collecting tank below the normal surface of the liquid therein, whereby escape of gas through said conduits is prevented.

9. Apparatus according to claim 3, wherein the curvilinear channel includes a constricted portion, and a relatively widened portion connected thereto, in the direction of flow of the gases, the channel thus having a Venturi nozzle-like shape.

10. Apparatus according to claim 3, wherein the curvilinear channel includes a constricted portion and a relatively widened portion connected thereto in the direction of flow of the gases, at least certain of the discharge openings being located in the region of constricted flow area of the channel.

11. Apparatus according to claim 3, wherein the channel is of helical form, and including a cone-shaped nozzle whose small inlet cross section is connected with the discharge end of the helical channel, and a discharge conduit for the purified gas connected with the larger outlet end of said nozzle.

12. Apparatus for the purification of gases by removal of suspended particles contained therein, comprising a conduit for the gas to be purified, an expansion nozzle connected to the conduit, a nozzle for introducing a precipitating fluid into the gas stream at a point at which the gas has been accelerated by means of the expansion nozzle above the admission velocity of the precipitating fluid into the gas stream, a helical channel connected to the expansion nozzle having a flat outer surface in a direction transverse to the direction of flow of the gases, openings located at the outer circumference of the channel and extending over practically the whole height of said flat outer surface, said openings receiving the separated fluid precipitates thrown outwardly of the moving gas stream, discharge conduits connected with said openings, a collecting tank for the separated fluid, each of said conduits discharging into said tank separately of the others and below the liquid level of the tank, whereby the escape of the gas from the channel is prevented.

13. Apparatus for the purification of gases by removal of suspended particles contained therein, comprising a conduit for the gas to be purified, an expansion nozzle connected to the conduit, a nozzle for introducing a precipitating fluid into the gas stream at a point at which the gas has been accelerated by means of the expansion nozzle above the admission velocity of the precipitating fluid into the gas stream, a helical channel connected to the expansion nozzle and having openings at the outer portion thereof toward which the fluid-loaded particles are thrown for effecting discharge of the so-separated fluid precipitates, a cone-shaped nozzle connected at its smaller, inlet cross-section with the channel, and a receiving conduit for the purified gas connected with the larger end of said cone-shaped nozzle.

14. Apparatus for the purification of gases by removal of suspended particles contained therein, comprising a conduit for charging the gas to be purified, means connected with such conduit for effecting acceleration of the gas stream, a nozzle for introducing a liquid under pressure in the region of acceleration of the gases to cause penetration of the gas stream by the liquid spray and to effect atomization of the liquid by the gas stream, members providing an annular passageway for the liquid-loaded gas stream, helically extending walls dividing the annular space into a plurality of helical passageways for the gas, said helical passageways contracting to a point intermediate their ends and then widening toward their discharge ends in the manner of a Venturi nozzle, and discharge openings in the outer of said members for the liquid-loaded particles which are impelled centrifugally outwardly along the channels.

15. Apparatus as set forth in claim 14, wherein the Venturi shape of the helical channels is produced by intermediate thickening of the channel walls.

16. Apparatus as set forth in claim 12, wherein the helical passageways are arranged below the region of the acceleration of the gases and introduction of the liquid, whereby the liquid-loaded gas travels continuously downward during the separation of the suspended particles.

17. Process for the purification of gases by removal of suspended matter contained therein with the aid of a liquid charged into a flowing stream of the gas, comprising providing a stream of gas to be purified, increasing the velocity of the stream of gas in a given direction, charging a liquid under pressure in finely divided condition into the gas stream in the region of high velocity and in such manner as to distribute the atomized liquid uniformly throughout the gas and cause it to load the foreign particles therein, conducting the gas stream along a curvilinear path in generally the same given direction to cause the loaded particles to be thrown to the outer confines of the path of flow, and separating the liquid-loaded particles at such outer confines from the flowing stream of gas.

18. Process according to claim 17 wherein the gas stream is conducted downwardly through a helical path to cause the loaded particles to be thrown centrifugally toward the outer periphery of the path.

19. Process according to claim 17 wherein the gas to be purified is subjected to a pressure drop to effect acceleration thereof, and wherein the liquid is introduced at a point of acceleration of the gases.

20. Process according to claim 17, wherein the liquid is introduced into the gas stream at the point of acceleration, the gas stream being then retarded for effecting substantially uniform distribution of the fluid precipitates, and thereafter again accelerated.

21. Apparatus according to claim 3, wherein the curvilinear channel diminishes gradually in cross-section to cause acceleration of the gases, and including conduits for the discharged liquid connected to the said openings, said conduits being out of communication with each other externally of the apparatus, whereby pressure differences within and along the length of the channel are maintained.

22. Process for the purification of gases by removal of suspended matter contained therein with the aid of a liquid charged into a flowing stream of the gas, comprising providing a stream of gas to be purified, increasing the velocity of the stream of gas in a given direction, charging a liquid under pressure in finely divided condition into the gas stream in the region of high velocity and in such manner as to distribute the atomized liquid uniformly throughout the gas and cause it to load the foreign particles therein, conducting the gas stream along a curvilinear path in generally the same given direction to cause the loaded particles to be thrown to the outer confines of the path of flow, and separating the liquid-loaded particles at such outer confines from the flowing stream of gas at spaced points along the path of flow of the gases and causing the particles to discharge into different spaces connected to such points and maintained at pressures corresponding to those prevailing along the path of flow at said points.

HANS HOLZWARTH.